No. 703,208. Patented June 24, 1902.
C. LAWRENCE.
FLEXIBLE RULER.
(Application filed Nov. 6, 1901.)

(No Model.)

Witnesses:
H. L. Amer.
L. E. Tibbitts.

Inventor:
Charles Lawrence.
By Rexford M. Smith
Att'y.

UNITED STATES PATENT OFFICE.

CHARLES LAWRENCE, OF NORRISTOWN, PENNSYLVANIA.

FLEXIBLE RULER.

SPECIFICATION forming part of Letters Patent No. 703,208, dated June 24, 1902.

Application filed November 6, 1901. Serial No. 81,310. (No model.)

*To all whom it may concern:*

Be it known that I, CHARLES LAWRENCE, a citizen of the United States, residing at Norristown, in the county of Montgomery and State of Pennsylvania, have invented a certain new and useful Flexible Ruler, of which the following is a specification, reference being had therein to the accompanying drawings.

This invention relates to flexible rulers, having for its object to produce a combined ruler and measure constructed in such manner as to render the same as a whole flexible, in order that it may accommodate itself to curved or irregular surfaces.

A further object of the invention is to provide a ruler one side or surface of which is composed of rubber or analogous material, which will adapt the ruler to be firmly held upon the surface being ruled with very little pressure by the hand of the operator. That portion of the ruler which is composed of rubber or the like is formed in one or both edges with gutters for catching and retaining any surplus ink which may be left by the pen on the ruling edge. On account of the elasticity and flexibility of the rubber, the ink received therein when it becomes dry cakes within the gutter, so that by flexing or compressing the edges of the rubber the ink will be caused to flake off, thus requiring very little attention to keep the edges of the rubber and the gutters in the proper condition.

With the above and other objects in view the invention consists in the novel construction, combination, and arrangement of parts hereinafter fully described, illustrated, and claimed.

Figure 1:
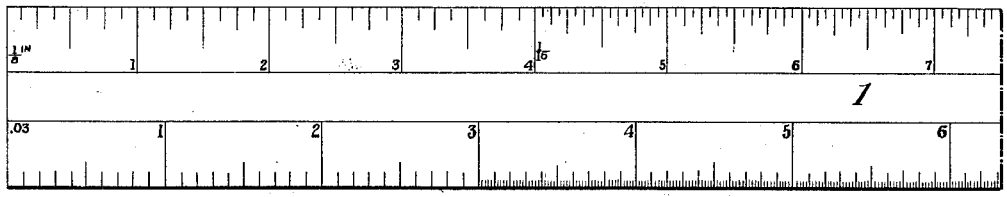
Figure 2:
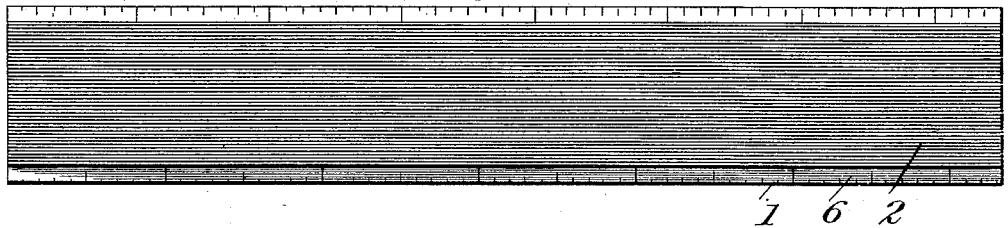
Figure 3:
Figure 4:
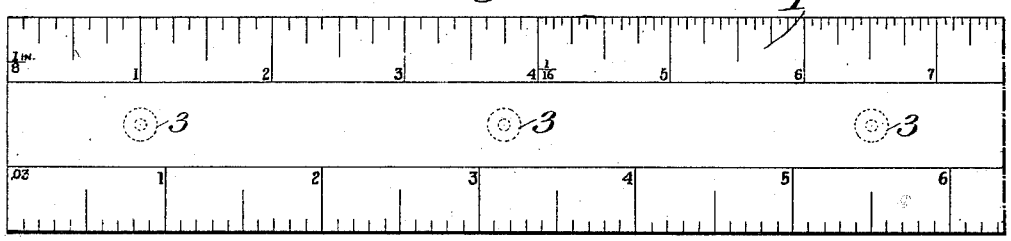
Figure 5:

In the accompanying drawings, Figure 1 is a plan view of a combined ruler and measure constructed in accordance with this invention. Fig. 2 is a reversed plan view of the same. Fig. 3 is a cross-section through the ruler. Fig. 4 is a plan view, similar to Fig. 1, showing the location of the studs or buttons by means of which the rubber section of the ruler is secured to the hard spring-strip. Fig. 5 is a cross-section through Fig. 4, taken in line with one of the buttons or studs.

Like reference-numerals designate corresponding parts in all the figures.

The combined ruler and measure contemplated in this invention consists, essentially, of two strips or sections 1 and 2, the section 1 being in the form of a strip or plate of hard spring material, such as steel, brass, or other metal or some equivalent material having sufficient resiliency to resume its normal straight position when relieved of pressure. Ordinarily the section 1 is composed of a strip of steel or brass, which may be nickel-plated or given any desired finish.

The ruler-section 1 is graduated along its opposite edges and preferably on both sides, as shown in Figs. 1 and 2, and in order to enhance the utility of the ruler it is graduated along one edge to represent the English linear measure and along the opposite edge to represent the French linear measure, although, of course, any other system or systems of measurement may be substituted for those mentioned. By providing the graduations on both sides of the section 1 said part of the ruler may be used with either side down, according to necessity.

The section 2 of the ruler is composed of some soft flexible material—such as rubber, felt, and the like—and is fastened directly to one surface of the strip 1 by means of glue, shellac, rivets, or studs or buttons, it not being desired to limit the construction of the ruler to any particular form of connection between the sections or strips 1 and 2. The section 2 is also made narrower than the section 1, so that the edges of the graduated strip will extend outward beyond the corresponding edges of the section 2 to give proper clearance for the ruling-pen and to prevent the ink on the pen from coming directly in contact with the adjacent edges of the rubber. In Figs. 4 and 5 the ruler-section 2 is shown secured to the section 1 by means of a plurality of buttons or studs 3. Each of said studs is shown as provided at opposite ends with disk-shaped or flat heads, one of which is soldered, brazed, or otherwise connected to the adjacent surface of the strip 1, while the opposite head is embedded in the section 2, which may be accomplished in any convenient way as by molding the rubber of the section 2 around the several studs or buttons, By reference to Figs. 3 and 5 it will be noticed that the section 2 is provided in its opposite edges with gutters 4, arranged beneath the strip or section 1 in position to catch any surplus ink remaining on the ruling edge and which flows downward therefrom. In the formation of the gutters 4 lips or flanges 5 are left at the outer sides or portions of the gutters, which lips or flanges project toward the spring strip or section 1. In ruling the rubber strip or section 2 rests upon the surface to be ruled, and on account of the nature and frictional adhesion of the rubber very little pressure is required on the part of the operator to hold the ruler steadily on said surface. In this position any ink passing from the pen upon the ruling edge is conducted downward and allowed to flow into the gutters 4, the opposite edges of the section 1 being preferably beveled or undercut, as shown at 6, to more effectively direct the flow of ink toward the gutters. In Fig. 3 the gutters are formed without regard to the pitch of the beveled edges 6; but in Fig. 5 the upper wall of the gutter is pitched at the same angle as the beveled edges 6, so as to register therewith and conduct the ink more quickly into the gutters.

It will of course be understood that rulers constructed in accordance with this invention may be made of any length, width, or thickness; also, that the foundation piece or section 2 may be composed of one or made up of two or more strips, as indicated by the dotted line 7 in Fig. 3, as may be found most expedient in manufacture. The ruler is especially adapted to the needs of bookkeepers, draftsmen, real-estate men, and clerks in general, and is especially useful in ruling surfaces which are curved or uneven or where the paper being ruled is supported upon an uneven surface. The parts of the ruler may be made separate and interchangeable, so that sections 1 or 2 of different widths may be associated with each other. On account of the rubber foundation-strip being flexible and yielding and by reason of the fact that the ink after becoming dry cakes or hardens in the gutters the gutters are rendered to a great extent self-clearing, as the flexing of the rubber will cause the dry ink to flake off, thus requiring very little or no attention to keep the edges of the rubber in proper condition.

I am aware that it is not broadly new to provide a flexible ruler, to graduate the ruler, and to sharpen the edges of the ruler to adapt the same for use as a paper-cutter. I am also aware that it is not new, broadly, to construct a ruler with an ink-receiving gutter to catch surplus ink and prevent the same from being smeared upon the surface being ruled. These features, broadly, I do not claim.

Having thus described the invention, I claim as new—

1. A flexible ruler comprising a hard spring-strip, and a soft, flexible strip secured along one surface thereof and of less width than the hard spring-strip, the soft and flexible strip being formed in its edge with an ink-receiving gutter which partakes of the resiliency of the soft strip and is overhung by the ruling edge of the ruler.

2. A flexible ruler comprising a hard spring-strip, and a soft, rubber strip secured thereto and provided in its edge with an ink-receiving gutter the walls of which partake of the yielding or elastic qualities of the strip in which the gutter is formed, for the purpose specified.

3. A flexible ruler composed of a flat hard spring-strip having its ruling edge undercut on a bevel, and a flat soft, elastic strip of less width secured thereto and provided in its edge with an elastic walled gutter one wall of which registers with the beveled edge of the hard spring-strip, substantially as described.

4. A flexible ruler comprising a hard spring-strip, studs or buttons projecting from one surface thereof, and a soft, flexible, and elastic strip secured flatwise against that surface of the spring-strip which carries the studs or buttons, the latter having their heads embedded in the soft strip, substantially as described.

In testimony whereof I affix my signature in presence of two witnesses.

CHARLES LAWRENCE.

Witnesses:
S. G. SOMMERS, Jr.,
H. H. HALLMAN.